United States Patent
Algüera Gallego et al.

(10) Patent No.: US 9,248,873 B2
(45) Date of Patent: Feb. 2, 2016

(54) AIR GUIDING ELEMENT

(71) Applicant: JOST-WERKE GMBH, Neu-Isenburg (DE)

(72) Inventors: José Manuel Algüera Gallego, Aschaffenburg (DE); Martin Richter, Frankfurt (DE)

(73) Assignee: JOST-WERKE GMBH, Neu-Isenburg (DE)

( * ) Notice: Subject to any disclaimer, the term of this patent is extended or adjusted under 35 U.S.C. 154(b) by 0 days.

(21) Appl. No.: 14/374,060

(22) PCT Filed: Jan. 7, 2013

(86) PCT No.: PCT/EP2013/050154
§ 371 (c)(1),
(2) Date: Jul. 23, 2014

(87) PCT Pub. No.: WO2013/110487
PCT Pub. Date: Aug. 1, 2013

(65) Prior Publication Data
US 2014/0361579 A1    Dec. 11, 2014

(30) Foreign Application Priority Data

Jan. 27, 2012    (DE) .......................... 10 2012 201 219

(51) Int. Cl.
*B62D 35/00*    (2006.01)
(52) U.S. Cl.
CPC ..................... *B62D 35/001* (2013.01)
(58) Field of Classification Search
CPC .......................... B62D 35/001; B62D 35/004
USPC .......... 296/180.1, 180.2, 180.3, 181.5, 107.1, 296/212
See application file for complete search history.

(56) References Cited

U.S. PATENT DOCUMENTS

| | | | |
|---|---|---|---|
| 3,711,146 A | 1/1973 | Madzsar et al. | |
| 3,834,752 A | 9/1974 | Cook et al. | |

(Continued)

FOREIGN PATENT DOCUMENTS

| | | | | |
|---|---|---|---|---|
| DE | 31 51 574 A1 | 7/1983 | | |
| DE | 3151574 A1 * | 7/1983 | ............. | B62D 35/00 |

(Continued)

OTHER PUBLICATIONS

Australian Office Action dated Oct. 22, 2015.

*Primary Examiner* — Jason S Morrow
*Assistant Examiner* — E Turner Hicks
(74) *Attorney, Agent, or Firm* — Hudak, Shunk & Farine Co. LPA (57) ABSTRACT

An air guiding element for improved flow over a gap between a tractive vehicle and a trailer vehicle is described, wherein the air guiding element can be mounted on the tractive vehicle or the trailer vehicle and has a flexible and airtight air cushion which is connected to a filling channel. The problem of providing a largely low-maintenance and operationally safe air guiding element, which can be installed independently of the compressed air supply of the tractive vehicle, for improved flow over the gap between a tractive vehicle and a trailer vehicle is addressed. The problem is solved by an air guiding element in which the filling channel has an air entry opening oriented in the direction of travel (F) on the side of the filling channel facing away from the air cushion, the air entry opening being arranged in such a way that the air cushion is filled exclusively by a dynamic pressure of the relative wind.

29 Claims, 6 Drawing Sheets

(56) References Cited

U.S. PATENT DOCUMENTS

| | | |
|---|---|---|
| 4,702,509 A | 10/1987 | Elliott, Sr. |
| 4,978,162 A | 12/1990 | Labbé |
| 5,000,508 A * | 3/1991 | Woods .................. 296/180.5 |
| 2006/0103167 A1* | 5/2006 | Wong et al. ............. 296/180.1 |
| 2010/0201152 A1* | 8/2010 | Smith ..................... 296/180.3 |
| 2010/0219661 A1* | 9/2010 | Butlin et al. ............ 296/180.1 |

FOREIGN PATENT DOCUMENTS

| | | | |
|---|---|---|---|
| DE | 40 21 337 A1 | 1/1992 | |
| DE | 10 2008 006 365 A1 | 7/2009 | |
| EP | 1 870 320 A2 | 12/2007 | |
| EP | 1870320 A2 * | 12/2007 | ............. B62D 35/00 |
| FR | 2 451 852 | 10/1980 | |
| GB | 2475032 A | 5/2011 | |

* cited by examiner

AIR GUIDING ELEMENT

FIELD OF THE INVENTION

The invention concerns an air guiding element for improved flow over a gap between a tractive vehicle and a trailer vehicle, wherein the air guiding element can be mounted on the tractive vehicle or the trailer vehicle and comprises a flexible and airtight air cushion which is connected to a filling channel.

BACKGROUND OF THE INVENTION

During driving operation, the tractive vehicle and the trailer vehicle are constantly joined together mechanically by a coupling device. By a tractive vehicle and a trailer vehicle is meant a tractor-trailer combination, which usually consists of an articulated tractor as the tractive vehicle and an articulated trailer as the trailer vehicle. The two vehicles in this case are detachably coupled together by a coupling mechanism comprising a fifth wheel and a king pin. But the invention can also be implemented on an articulated vehicle consisting of a motor vehicle as the tractive vehicle and a trailer as the trailer vehicle. Such vehicles are usually joined together by means of a coupling mechanism comprising a bolt coupling and a tow bar secured therein. Furthermore, it is also possible in the case of multiple trailer vehicles for the tractive vehicle to comprise a front articulated trailer or plain trailer arranged closer to the tractive vehicle and for the trailer vehicle to comprise a rear articulated trailer or plain trailer further away from the articulated tractor or motor vehicle.

Between the tractive vehicle and the trailer vehicle in the coupled state there is a gap, which produces considerable turbulence of the passing air during travel and thus causes a relatively high fuel consumption. However, a minimum gap width is needed, since a relative movement between tractive vehicle and trailer vehicle occurs especially when negotiating curves and without it there is the danger of the front edge of the trailer vehicle on the inside of the curve colliding with the tractive vehicle in the case of a sharp curve. Also during abrupt braking parts of the trailer vehicle can strike against the tractive vehicle on account of shifting of the payload.

In the past, therefore, efforts were already made to cover the gap between tractive vehicle and trailer vehicle, for example with air guiding elements. For example, from U.S. Pat. No. 3,711,146 there is known an air guiding apron engaging with the rear wall of the driver's cabin, comprising several telescoping segments in the lengthwise axis of the vehicle. Before driving away, the segments are pulled out and the width of the air guiding apron is adjusted to the width of the actual gap so that the gap is largely covered. The segment of the air guiding apron adjoining a trailer should be made of rubber or another elastic material and allow for the impact of parts of the trailer when driving along larger curve radii. For narrow curve radii or a changing of trailers, the air guiding apron can be pushed back manually or by means of servo cylinders in the direction of the driver's cabin. The major drawback to this known air guiding apron is its adjustment before driving away and the resulting unavoidable impact of the trailer against the air guiding apron. This always causes damage to the air guiding apron or the trailer.

A generic prior art is U.S. Pat. No. 3,834,752. The bridging of the gap between tractive vehicle and trailer vehicle in this case is realized by means of an inflatable air bag, which is arranged on the front end of the trailer vehicle and after the coupling on of the tractive vehicle it is detachably secured to the rear wall of the driver's cabin. The otherwise closed air bag is inflated via a compressed air line of the tractive vehicle and thereby stabilized. The compressed air supply of the air bag should come in particular via the compressor of the vehicle brake system. It has proven to be a drawback that the tractive vehicle needs to be outfitted with a substantial compressor power in order to fill the volume of the air bag, several cubic meters in size, in addition to the braking system. This problem is further aggravated when the air bag loses tightness due to damage and therefore the compressor is no longer able to fill the pressure accumulator of the brake system. In some cases, this may lead to loss of the brake system, so that the articulated vehicle is disabled from driving.

SUMMARY OF THE INVENTION

For this reason, the invention addresses the problem of providing a largely low-maintenance and operationally safe air guiding element, which can be installed independently of the compressed air supply of the tractive vehicle, for improved flow over the gap between a tractive vehicle and a trailer vehicle.

The problem is solved according to the invention in that the filling channel has an air entry opening oriented in the direction of travel on the side of the filling channel facing away from the air cushion, being arranged in such a way that the air cushion is filled exclusively by a dynamic pressure of the relative wind. By an air cushion is meant an enclosed shell of a flexible and air-tight wall material. The filling channel can be formed from a pipeline or a borehole. The filling channel passes directly into the air entry opening, which is preferably conically widened in the direction of travel. The dynamic pressure corresponds to the pressure increase at the stagnation point of a body placed in an air flow, as compared to the static pressure of the fluid, here, the surrounding air.

With the aid of the air guiding element according to the invention, the gap between tractor and trailer vehicle can be closed almost completely. Only slight modifications are needed for this, so that the air guiding element can also be retrofitted on existing vehicle.

For an aerodynamically favorable effect, the air cushion at the tractive vehicle side should be adapted to the cross section contour of the vehicle body, which furthermore makes possible a fastening all around. At the trailer vehicle side, the air cushion must be adjusted to its height and width. In front of the upper region of the air cushion it is possible to place a roof spoiler, so that the height level of the trailer vehicle is already reached and the air cushion only needs to bridge the gap space in the horizontal direction. In this case, the roof wall of the tractive vehicle is formed by the roof spoiler. The invention also encompasses such an inflatable roof spoiler, formed from an air cushion, but which can also be adjusted beyond the horizontal level.

According to one simple embodiment, the air cushion collapses at low speed in that the interior pressure escapes through the filling channel, which is receiving little or no more dynamic pressure. In this way, with no additional control system components, electronic controls, or valves, a maneuvering is possible at low driving speed with large relative movements between tractive vehicle and trailer vehicle.

The required interior pressure is tapped at the front of the tractive vehicle and increased with the speed. In this way, the air cushion can be inflated enough, especially at higher speeds, so that it also performs a sealing function between tractive vehicle and trailer vehicle. The air cushion in this case remains elastic enough so as not to hinder steering movements and thus relative movements between the so tractive vehicle and the trailer vehicle.

The air cushion is preferably firmly installed on the tractive vehicle. However, an installation on the front of the trailer vehicle is also conceivable. But the air cushion can also be mounted firmly only on the tractive vehicle or the trailer vehicle, since when driving slow, especially during maneuvering, it is necessary to allow a relative movement of tractor and trailer vehicle without being ripped.

A further benefit of the air guiding element according to the invention is that, with suitable design of materials, a controlled escaping of the energy of the internal pressure prevailing in the air cushion takes place in event of an accident, if the coupling mechanism happens to be break and the trailer vehicle hits the body of the tractive vehicle from behind, especially the driver's cabin.

Advantageously, the at least one air cushion in U shape is adapted to an outer cross section contour of a boxlike body of the tractive vehicle and borders on a roof wall and two side walls of the body. This design is advantageous in that a supply line bracket located on the rear wall of the body continues to be functional and is not in the way, even when the air cushion is inflated.

Alternatively to the above described embodiment, the air cushion(s) can entirely fill the gap within the outer cross section contour of a boxlike body of the tractive vehicle. This embodiment is especially advantageous when the air cushion needs to be suitable to cushioning a trailer vehicle striking against the tractive vehicle. Furthermore, the air cushion is especially favorably deformed on very narrow curves, without having to release a portion of the air or having an increase in the internal pressure causing greater wear on the structural parts, since the air enclosed in the air cushion can flow with a large volume and no constriction or diversion from the inside of the curve, where the volume is smaller on account of the tractive and trailer vehicles coming closer together, to the outside of the curve with a large volume.

Preferably, a single air cushion is provided. This enables an especially simple buildup and release of the internal pressure inside the air cushion. The single air cushion can cover either the entire cross section contour of the body in the direction of travel of the tractive vehicle or only portions thereof, especially thanks to a U-shaped construction.

According to one especially favored embodiment, several air cushions are arranged in a row, so that a precise adapting of several air cushions to the cross section contour of the body can occur and at the same time important systems on the rear wall of the body can be spared.

Advisedly, the at least one air cushion has several air chambers on the inside, which makes possible an especially effective stiffening of the at least one air cushion.

In addition to or in place of air chambers the at least one air cushion can have a stiffening by means of support braces. The support braces are elastic rods which help the air cushion assume a predetermined shape and prevent a flattening out in the pressureless state of the air cushion. The support braces can be arranged on the inside or on the outside on the air cushion. Preferably, the support braces are mounted stationary on the body and manufactured as an integrated, homogeneous structural part.

Surprisingly, it has been found that a significant improvement in the coefficient of air drag is accomplished already when the air guiding element reduces the gap to a residual gap dimension of at most 500 mm.

Advantageously, a check valve is arranged inside the filling channel and/or at its entry on the air cushion. The check valve can remain closed at a predetermined lower driving speed, so that the air cushion retains its maximum contour and does not collapse in the meantime, for example in heavy traffic, when driving through town or generally at changing driving speeds.

Advisedly, however, the air cushion should interact with a relief valve, by which the internal pressure of the air cushion is released to the surroundings when maneuvering or when switching the trailer vehicle. When switching the trailer vehicle, this procedure also ensures that even trailer vehicles with a larger front elevation can be hooked up without colliding with the air cushion. Preferably, the check valve serves as the relief valve.

According to an especially preferred embodiment, the air cushion is fastened to a shape-stable spoiler. This shape-stable spoiler can be arranged as a roof spoiler on the roof wall of the body or as a side spoiler on the side walls of the body and preferably it engages in swiveling fashion with the tractive vehicle by its front end in the direction of travel. Thus, the shape-stable spoiler is permanently and directly fastened to the body in at least one location. This has the advantage that a major portion of the forces acting on the spoiler are diverted into the body thanks to the swiveling mounting. Torsional forces or tensile forces would be hard to control by a force closure only through the air cushion. With the help of the air cushion, the shape-stable spoiler positions itself in the designed driving position depending on the speed. The air cushion thus serves as an actuator for the shape-stable spoiler, which is forcibly actuated relative to the body.

BRIEF DESCRIPTION OF THE DRAWINGS

For a better comprehension, the invention will now be explained more closely by means of 8 figures. There are shown.

DETAILED DESCRIPTION OF THE INVENTION

Figure 1:
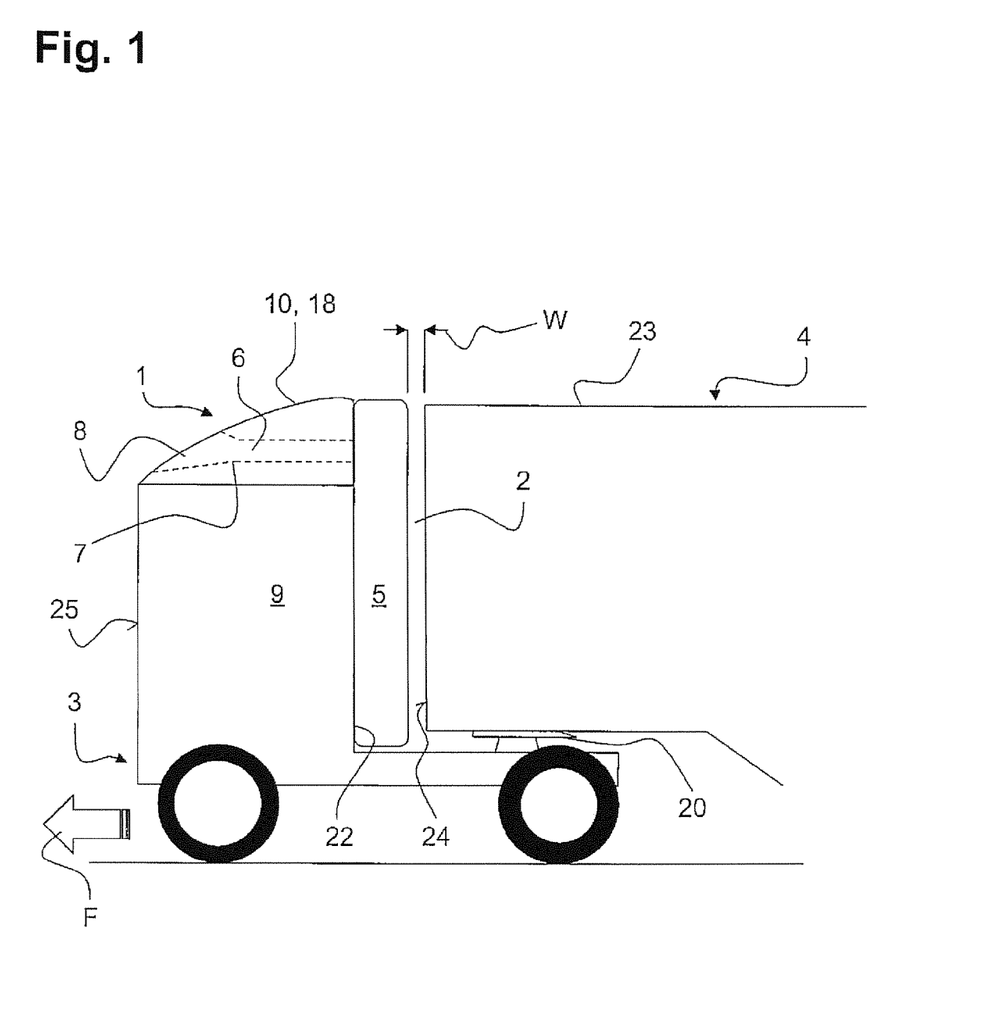
FIG. 1: a schematic side view of a tractor and trailer vehicle with an air guiding element in driving mode according to a first embodiment.

FIG. 1 shows the air guiding element 1 according to the invention, comprising an air cushion 5 and a filling channel 6 connected thereto, emerging at its front end in the direction of travel F on an upstream side 25 of the tractive vehicle 3. By upstream side is meant the contour of the tractive vehicle 3 facing the flow of the relative wind.

The air cushion 5 is arranged in a gap 2 between a tractive vehicle 3 and a trailer vehicle 4. The tractive vehicle 3 is an articulated vehicle, at whose rear end is situated a typical fifth wheel 20 as the coupling mechanism. The trailer vehicle 4, accordingly, is in the form of an articulated trailer and is detachably held in the fifth wheel 20 by means of a king pin (not shown) fastened to its underside.

The tractive vehicle 3 has a body 9, in which the driver's cabin among other things is accommodated. Above the body 9, furthermore, one notices a firmly mounted spoiler 18, which bounds the body 9 at the top in the manner of a roof wall 10. In this case, the vertical level of the roof wall 10 corresponds roughly to the level of the trailer vehicle 4.

On a rear wall 22 of the body 9 of the tractive vehicle 3 moving in the direction of travel F is mounted the air cushion 5, which in the driving mode illustrated is inflated to its maximum size and terminates with both the roof wall 10 of the tractive vehicle 3, formed by the spoiler 18, and the roof wall 23 of the trailer vehicle 4 in a common horizontal plane. In the direction of travel F, a residual gap dimension W of at most 500 mm can remain between the air cushion 5 and a front end 24 of the trailer vehicle 4.

The air cushion 5 is connected to the filling channel 6, which emerges in an air entry opening 8 on a side 7 facing away from the air cushion 5 in the direction of travel F of the tractive vehicle 3. The air entry opening 8 is oriented in the direction of travel F and accordingly receives the flow of relative wind in the driving operation. Preferably, the air entry opening 8 has a conical widening in the direction of travel F, so that a dynamic pressure is especially efficiently built up inside the filling channel 6 and the air cushion 5 located behind it. Thanks to the dynamic pressure, the air cushion 5 is inflated or collapses when the dynamic pressure abates. Since usually on a fast straight driving stretch no tight curves are expected with substantial relative movement between tractive vehicle 3 and trailer vehicle 4, the air cushion 5 is filled to the maximum and a minimal residual gap dimension W is established.

Figure 2:
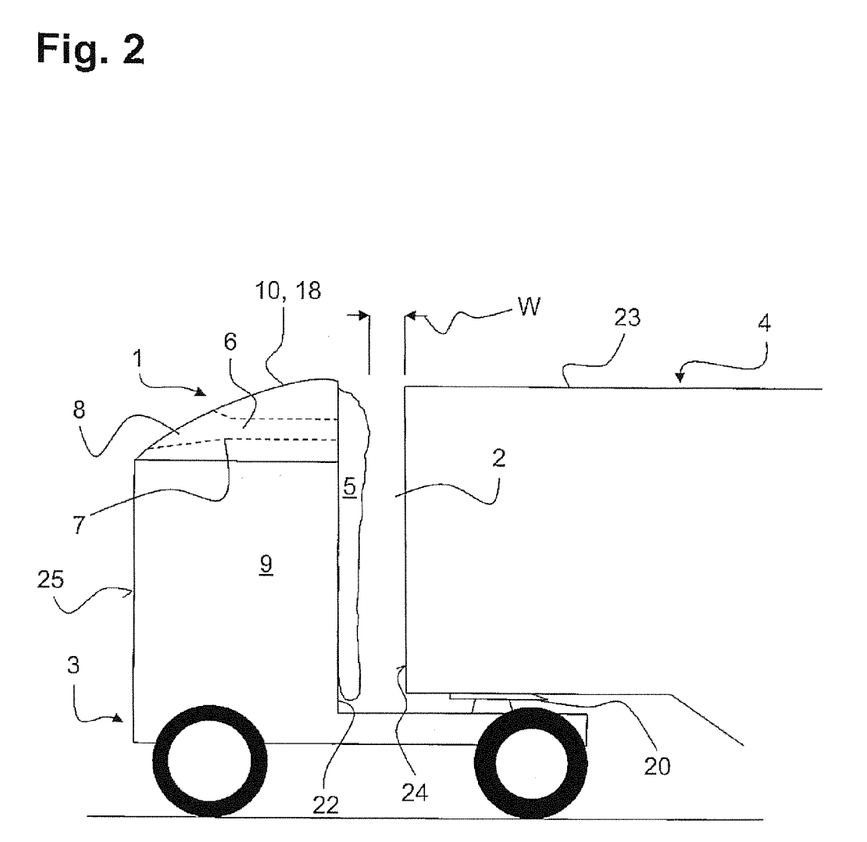
FIG. 2: a side view of FIG. 1 with the air guiding element in parking and maneuvering mode.

As soon as the tractive vehicle 3 slackens in its driving speed, the dynamic pressure in the air cushion 5 also drops, so that it collapses in the parking and maneuvering mode, corresponding to the representation in FIG. 2.

FIG. 2 shows a parked tractive vehicle 3, whose air cushion 5 is collapsed under its own weight due to lack of dynamic pressure. Consequently, the residual gap dimension W has more than doubled, so that now a maneuvering with a narrow curve radius is also possible. The dynamic pressure built up while driving has already escaped progressively through the filling channel 6 as the driving speed decreased.

Figure 3:
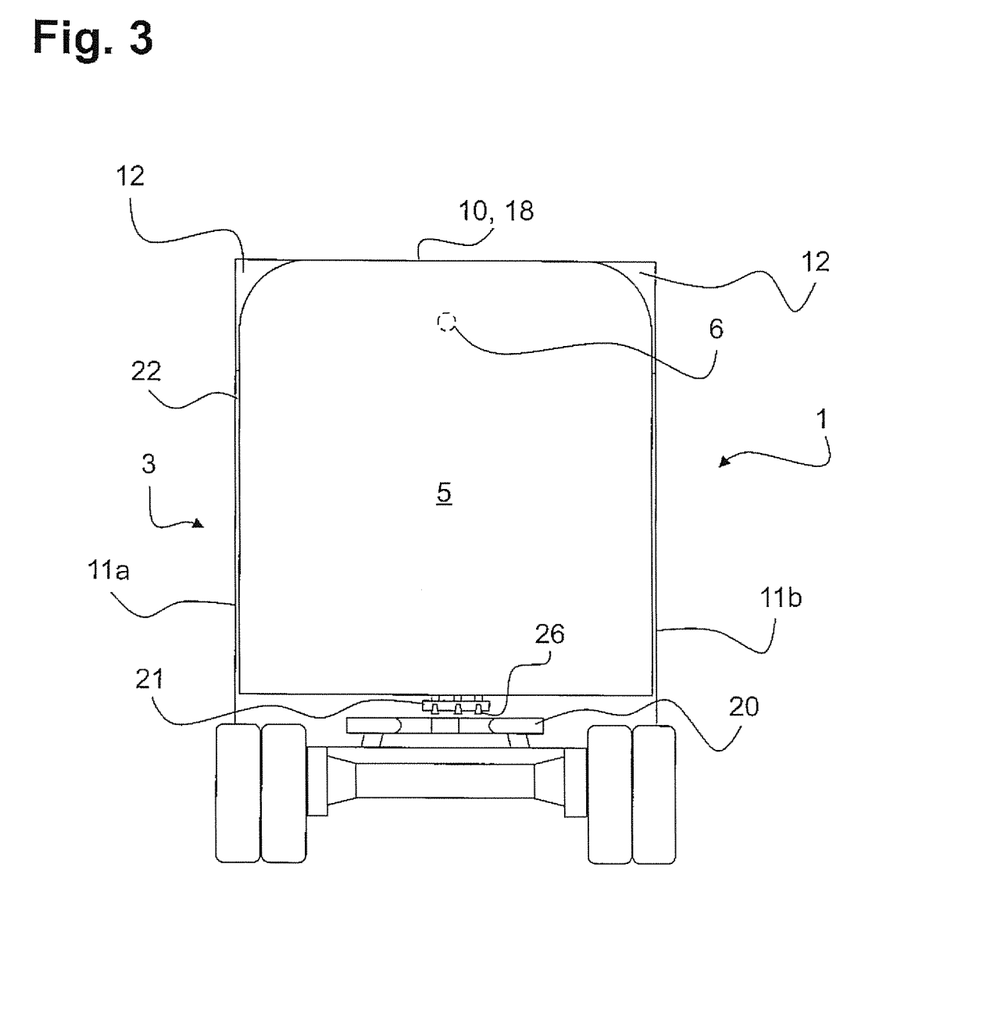
FIG. 3: a rear view of the tractive vehicle of FIG. 1.

FIG. 3 illustrates the approximately full-surface coverage of a cross section contour 12 of the body 9 in the direction of travel F of the tractive vehicle 3 by the air cushion 5. In the present case, the body 9 is elevated by the spoiler 18 to the level of the trailer vehicle 4. The air cushion 5 is consequently flush with the spoiler 18 at its top end. In the sideways direction the air cushion 5 extends as far as the side walls 11a, 11b, which continue in the region of the spoiler 18.

Thanks to the full-surface coverage of the rear wall 22 of the body 9 by the air cushion 5, it is necessary to move supply line bracket 21, which is normally situated at the center of the rear wall 22, and to make possible an access to the supply lines 26.

Figure 4:
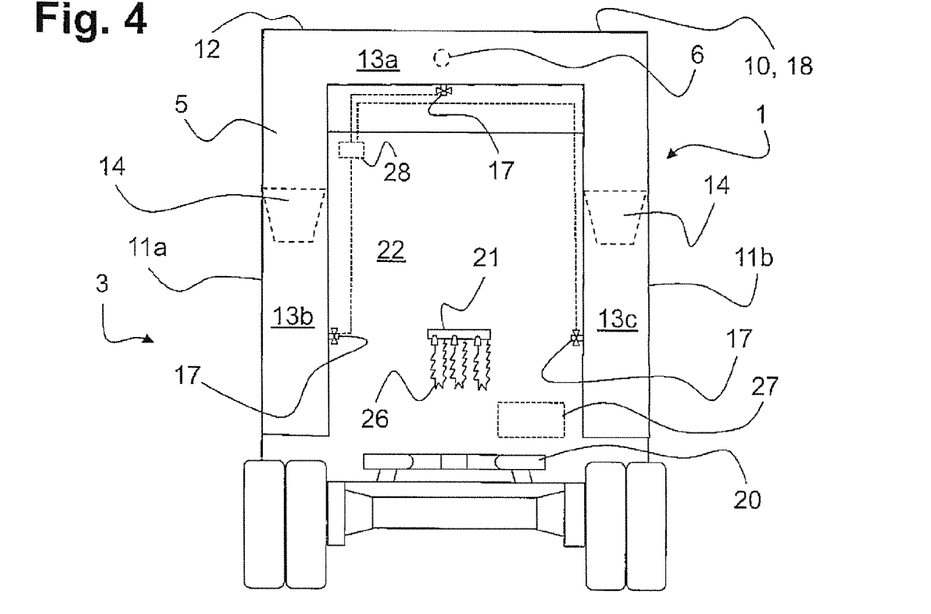
FIG. 4: a rear view of the tractive vehicle and an air guiding element according to a second embodiment.

FIG. 4 shows an alternative embodiment of the air cushion 5 in U-shape, where only outer edge segments of the rear wall 22 are covered by the air cushion 5 bordering the side walls 11a, 11b and the roof wall 10. The cross section contour 12 of the body 9 is thus covered by the air cushion 5 only on its outer edge region.

The supply line bracket 21 arranged at the center of the rear wall 22 is only partly enclosed by the air cushion 5 and can easily be used with no further modification work.

The filling of the air cushion 5 and the subsequent buildup of dynamic pressure occurs via the filling channel 6, which emerges horizontally into the air cushion 5. The air cushion 5 is provided with a chamber-forming cone 14 in several places inside the closed body for an especially stable rigidity. The cone 14 on the one hand provides a supporting action to the air cushion 5 when the dynamic pressure is still low and on the other hand it prevents an emptying of the entire air cushion 5 when there are leaks. When a leak occurs, only one of the air chambers 13a, 13b, 13c is affected by it. The other air chambers 13a, 13b, 13c contain to maintain their shape.

However, it is necessary to provide for a venting of the air cushion 5 on both sides of the chamber-forming cone 14. Preferably, this is accomplished by several relief valves 17 arranged decentralized on the air cushion 5.

An opening of the relief valve 17 occurs, for example, manually by the driver of the tractive vehicle 3. Especially preferable, however, is a connecting of the relief valve 17 to the vehicle controller (27) in dependence on a predetermined braking or steering gradient. In this case, the relief valve is actuated by the vehicle controller, wherein the braking or steering gradient is generated directly in the vehicle controller (27) or an external controller (28) assigned to the relief valve. Consequently, the control signal for the relief valve (17) as derived from the braking or steering gradient can also be determined inside the vehicle controller (27) or the external controller (28). The braking or steering gradient is calculated from an increase in the brake pressure or a deflection of the steering wheel per unit of time, so that during maneuvering or full braking with a following avoidance maneuver the dynamic pressure can escape through the relief valve(s) 17 and a sufficiently large residual gap dimension W (see FIGS. 1 and 2) is available for the necessary relative movement between tractive vehicle 3 and trailer vehicle 4.

Figure 5:
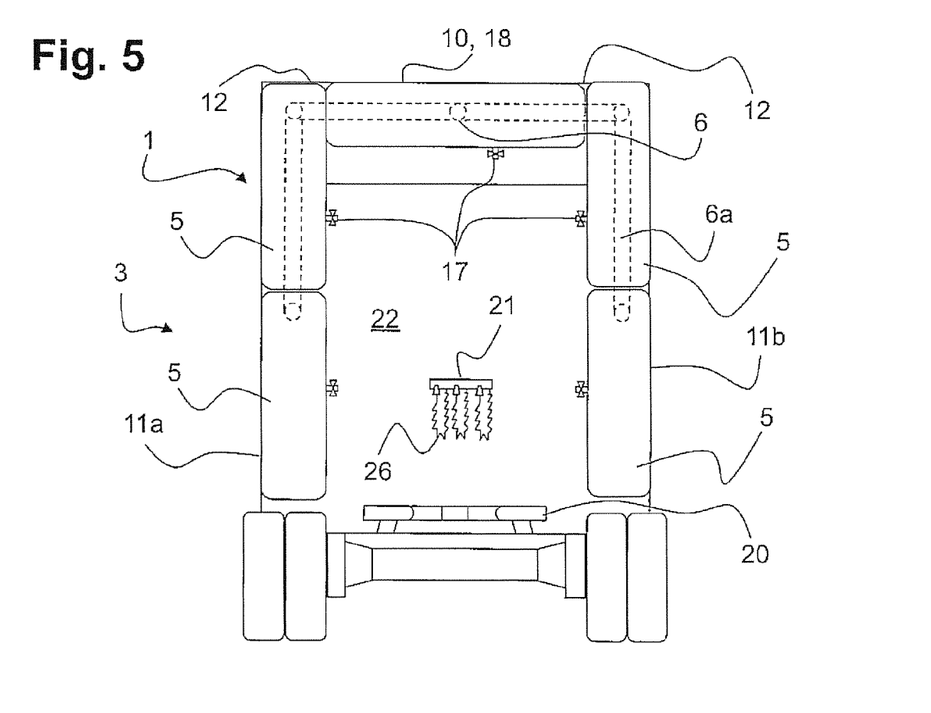
FIG. 5: a rear view of the tractive vehicle and an air guiding element according to a third embodiment.

FIG. 5 shows another embodiment of the air cushion 5, but where the U-shape has been achieved through several adjoining air cushions 5. The filling and the building up of the dynamic pressure occurs via the filling channel 6, but this branches out by several distribution channels 6a and thus can be connected to several air cushions 5. The emptying of the several air cushions 5 can, but need not be accomplished through several relief valves 17. Likewise, it would be possible to inflate several air cushions 5 through the filling channel 6 and the distribution channels 6a.

Figure 6:
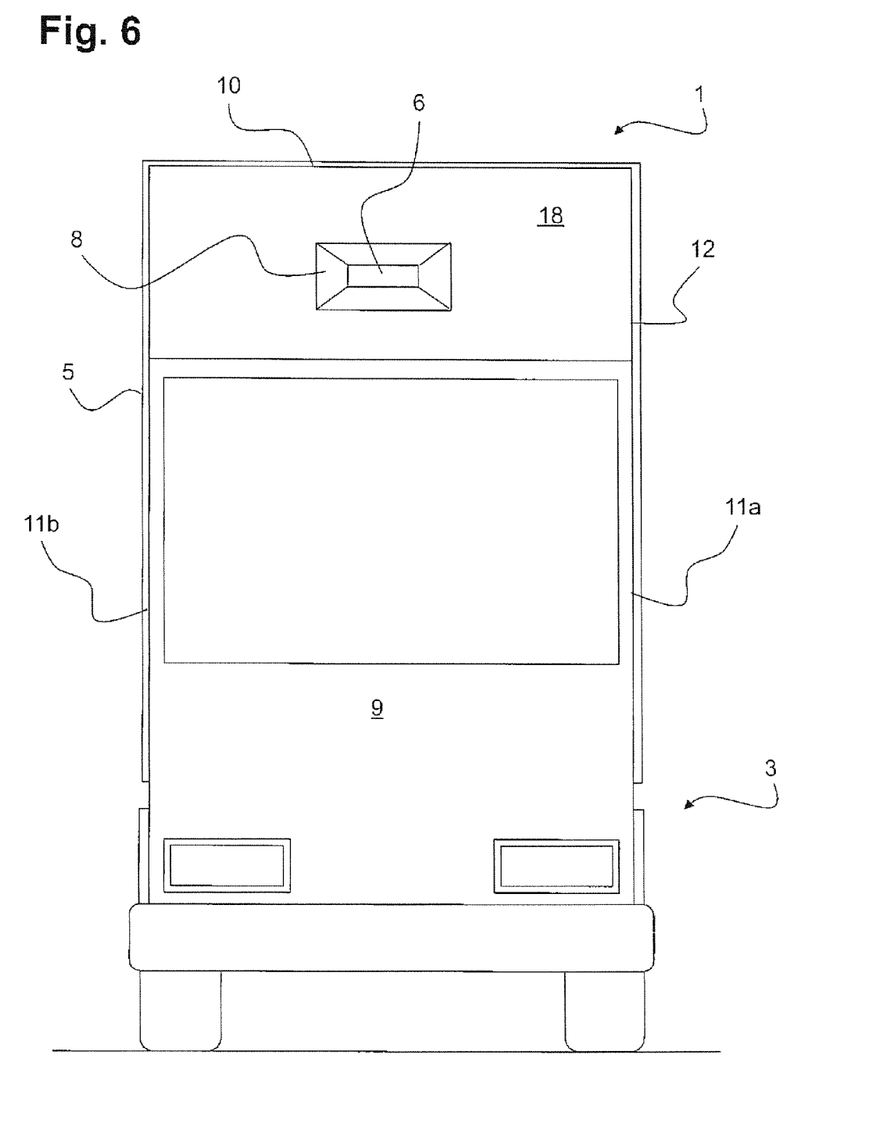
FIG. 6: a front view of the tractive vehicle with an air entry opening arranged on a roof spoiler.

FIG. 6 shows a tractive vehicle 3 in driving mode with trailer vehicle 4, that is, with inflated air cushion 5 of the air guiding element 1. The air cushion 5 projects slightly at the side beyond both the side walls 11a, 11b and the roof wall 10 formed by the spoiler 18. The filling channel 6 is integrated in the spoiler 18.

In order to provide a sufficient dynamic pressure in the driving mode, the filling channel 6 situated in the lengthwise axis of the vehicle has an air entry opening 8 widening conically in the direction of travel. Basically, however, it would also be possible to provide the filling channel 6 above the spoiler 18, at the side, or underneath the body 9.

Figure 7:
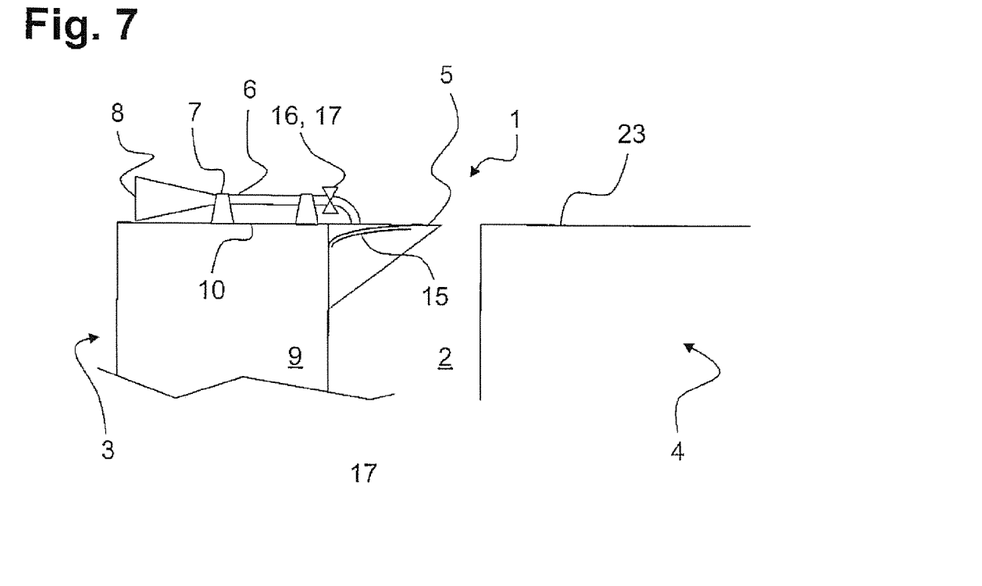
FIG. 7: a cutout of a side view of the tractor and trailer vehicle with an air guiding element according to a fourth embodiment.

FIG. 7 shows another embodiment, in which the air cushion 5 is formed as an apron with a triangular cross section. The segment of the air cushion 5 adjoining the body 9 of the tractive vehicle 3 is relatively small in relation to the width of the gap 2 being bridged. For this reason, there are several support braces 15 to maintain the profile and stiffen the inside of the air cushion 5. The support braces 15 have elastic properties and become deformed (reversibly, as an option) in the parking and maneuvering mode.

The embodiment of FIG. 7 has a common check and relief valve 16, 17. This prevents the air cushion 5 from constantly changing its external shape during fluctuating driving speed of the tractive vehicle 3. The relief valve 17 is actuated as was described for FIG. 5, but it is not necessary here to connect the relief valve 17 permanently to the flexible wall material of the air cushion 5.

Figure 8:
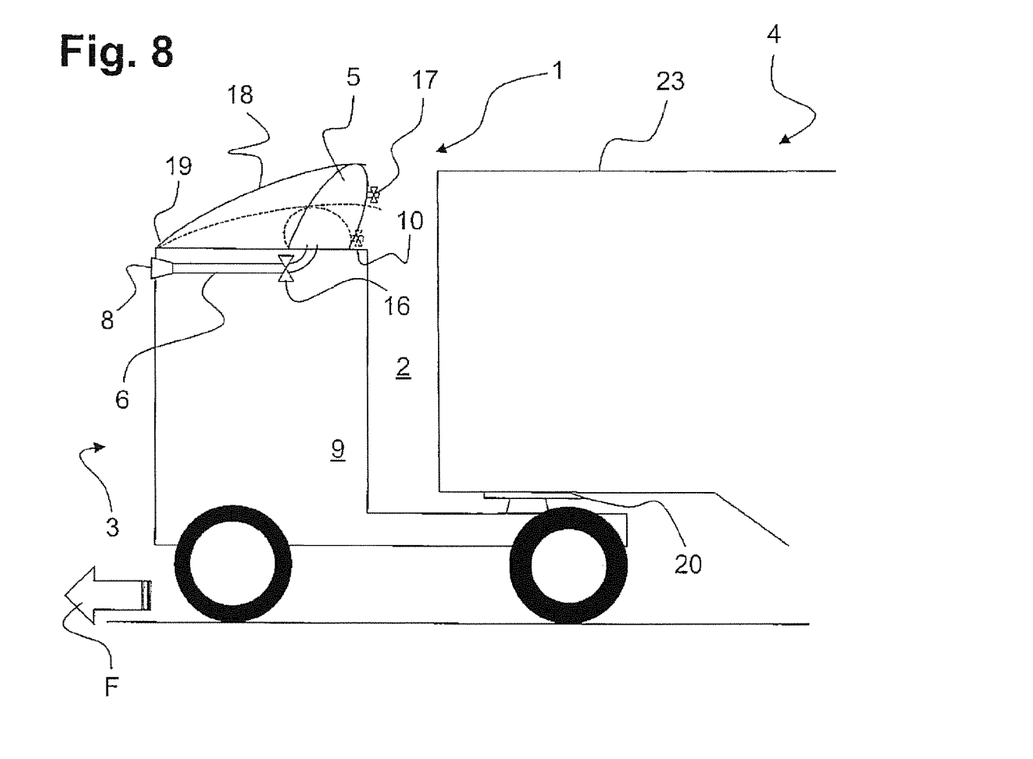
FIG. 8: a side view of the tractor and trailer vehicle with an air guiding element according to a fifth embodiment.

In the embodiment of FIG. 8, the air cushion 5 interacts with a shape-stable spoiler 18. For example, the solid line shows the position of the spoiler 18 in the driving mode and the broken line that in the parking and maneuvering mode.

The air guiding element 1 with the air cushion 5 and the shape-stable spoiler 18 is situated on the roof wall 10 of the body 9, while the roof wall 10 is arranged at a lower level than the roof wall 23 of the trailer vehicle 4. In driving mode, the air cushion 5 is inflated and thereby pushes the spoiler 18 far enough upward so that it approximately reaches or slightly surpasses by its end next to the trailer vehicle 4 the vertical level of the roof wall 23 of the trailer vehicle 4.

The spoiler 18 is pivoted by its front end 19 on or near the roof wall 10.

The filling of the air cushion 5 and the subsequent build-up of dynamic pressure is likewise realized through the filling channel 6, which is led past the body 9 and oriented in the direction of travel F for this purpose. Inside the filling channel 6 there is a check valve 16, which is especially useful in this embodiment and which holds the air cushion 5 loaded by the spoiler 18 in the maximum inflated position, even during fluctuating driving speed. The relief valve 17 can be arranged, as shown, directly on the air cushion 5 or in the filling channel 6 as a combination valve together with the check valve 16.

LIST OF REFERENCES NUMBERS

1 Air guiding element
2 Gap
3 Tractive vehicle
4 Trailer vehicle
5 Air cushion
6 Filling channel
6a Distribution channel
7 Filling channel side facing away from air cushion
8 Air entry opening
9 Body, tractive vehicle
10 Roof wall
11a, b Side wall
12 Cross section contour, body
13a-c Air chambers
14 Chamber-forming cone
15 Support braces
16 Check valve
17 Relief valve
18 Spoiler
19 Front end, spoiler
20 Fifth wheel
21 Supply line bracket
22 Rear wall, tractive vehicle body
23 Roof wall, trailer vehicle
24 Front end, trailer vehicle
25 Upstream side, tractive vehicle
26 Supply line
27 Vehicle controller
28 External controller
F Direction of travel
W Residual gap dimension

What is claimed is:

1. An air guiding element for improved flow over a gap between a tractive vehicle and a trailer vehicle, wherein the air guiding element can be mounted on the tractive vehicle or the trailer vehicle and comprises: a flexible and airtight air cushion, which is connected to a filling channel, wherein the filling channel has an air entry opening oriented in the direction of travel (F) on a side of the filling channel facing away from the air cushion, said air entry opening being arranged in such a way that the air cushion is filled exclusively by a dynamic pressure of a relative wind, wherein the air cushion entirely fills the gap within an outer cross section contour of a boxlike body of the tractive vehicle, and wherein the air enclosed in the air cushion can flow from the inside of a curve, wherein the volume is smaller on account of the tractive and trailer vehicles coming close together, to the outside of the curve with a large volume.

2. The air guiding element according to claim 1, wherein a check valve is arranged one or more of inside the filling channel and on the air cushion.

3. The air guiding element according to claim 1, wherein the at least one air cushion is stiffened.

4. The air guiding element according to claim 1, wherein the air guiding element reduces the gap to a residual gap dimension (W) of at most 500 mm.

5. An air guiding element for improved flow over a gap between a tractive vehicle and a trailer vehicle, wherein the air guiding element can be mounted on the tractive vehicle or the trailer vehicle and comprises:
a flexible and airtight air cushion, which is connected to a filling channel, wherein the filling channel has an air entry opening oriented in the direction of travel (F) on a side of the filling channel facing away from the air cushion, said air entry opening being arranged in such a way that the air cushion is filled exclusively by a dynamic pressure of a relative wind,
wherein a check valve is arranged one or more of inside the filling channel and on the air cushion.

6. The air guiding element according to claim 1, wherein a relief valve is arranged on the air cushion.

7. The air guiding element according to claim 6, wherein the relief valve interacts with one or more of a vehicle controller and an external controller.

8. The air guiding element according to claim 7, wherein one or more of the vehicle controller and the external controller provides a control signal for the relief valve, which takes into account a braking or steering gradient.

9. The air guiding element according to claim 1, wherein the air cushion is fastened to a shape-stable spoiler.

10. The air guiding element according to claim 9, wherein the spoiler engages by its front end in the direction of travel (F) with the tractive vehicle in swiveling fashion.

11. The air guiding element according to claim 5, wherein the at least one air cushion in U shape is adapted to an outer cross section contour of a boxlike body of the tractive vehicle and borders on a roof wall and two side walls of the body.

12. The air guiding element according to claim 5, wherein the air cushion entirely fills the gap within the outer cross section contour of a boxlike body of the tractive vehicle.

13. The air guiding element according to claim 5, wherein the at least one air cushion has several air chambers on the inside.

14. The air guiding element according to claim 5, wherein the at least one air cushion is stiffened.

15. The air guiding element according to claim 5, wherein the air guiding element reduces the gap to a residual gap dimension (W) of at most 500 mm.

16. The air guiding element according to claim 5, wherein a relief valve is arranged on the air cushion.

17. The air guiding element according to claim 16, wherein the relief valve interacts with one or more of a vehicle controller and an external controller.

18. The air guiding element according to claim 17, wherein one or more of the vehicle controller and the external controller provides a control signal for the relief valve, which takes into account a braking or steering gradient.

19. The air guiding element according to claim 5, wherein the air cushion is fastened to a shape-stable spoiler.

20. The air guiding element according to claim 19, wherein the spoiler engages by its front end in the direction of travel (F) with the tractive vehicle in swiveling fashion.

21. The air guiding element according to claim 11, wherein the at least one air cushion has several air chambers on the inside.

22. The air guiding element according to claim 21, wherein the at least one air cushion is stiffened by support braces.

23. The air guiding element according to claim 22, wherein the air guiding element reduces the gap to a residual gap dimension (W) of at most 500 mm, wherein a check valve is arranged inside the filling channel and/or on the air cushion, and wherein a relief valve is arranged on the air cushion.

24. The air guiding element according to claim 23, wherein the relief valve interacts with one or more of a vehicle controller and an external controller, wherein one or more of the vehicle controller and the external controller provides a control signal for the relief valve, which takes into account a braking or steering gradient, wherein the air cushion is fastened to a shape-stable spoiler, and wherein the spoiler engages by its front end in the direction of travel (F) with the tractive vehicle in swiveling fashion.

25. The air guiding element according to claim 12, wherein the at least one air cushion has several air chambers on the inside.

26. The air guiding element according to claim 25, wherein the at least one air cushion is stiffened by support braces.

27. The air guiding element according to claim 26, wherein the air guiding element reduces the gap to a residual gap dimension (W) of at most 500 mm, wherein a check valve is arranged inside the filling channel and/or on the air cushion, wherein a relief valve is arranged on the air cushion.

28. The air guiding element according to claim 27, wherein the relief valve interacts with one or more of a vehicle controller and an external controller, wherein one or more of the vehicle controller and the external controller provides a control signal for the relief valve, which takes into account a braking or steering gradient, wherein the air cushion is fastened to a shape-stable spoiler, and wherein the spoiler engages by its front end in the direction of travel (F) with the tractive vehicle in swiveling fashion.

29. An air guiding element for improved flow over a gap between a tractive vehicle and a trailer vehicle, wherein the air guiding element can be mounted on the tractive vehicle or the trailer vehicle and comprises:
   a flexible and airtight air cushion, which is connected to a filling channel, wherein the filling channel has an air entry opening oriented in the direction of travel (F) on a side of the filling channel facing away from the air cushion, said air entry opening being arranged in such a way that the air cushion is filled exclusively by a dynamic pressure of a relative wind,
   wherein a relief valve is arranged on the air cushion, the relief valve interacting with one or more of a vehicle controller and an external controller, and one or more of the vehicle controller and the external controller provides a control signal for the relief valve, which takes into account a braking or steering gradient.

* * * * *